(12) United States Patent
Roncalli et al.

(10) Patent No.: US 11,878,323 B2
(45) Date of Patent: Jan. 23, 2024

(54) POWDER-COATING PROCESS OF A BRAKE CALIPER

(71) Applicant: FRENI BREMBO S.P.A., Curno (IT)

(72) Inventors: Gianluigi Roncalli, Curno (IT); Alessio Garghentini, Curno (IT)

(73) Assignee: Brembo S.p.A., Curno (IT)

( * ) Notice: Subject to any disclaimer, the term of this patent is extended or adjusted under 35 U.S.C. 154(b) by 472 days.

(21) Appl. No.: 17/056,041

(22) PCT Filed: May 16, 2019

(86) PCT No.: PCT/IB2019/054071
§ 371 (c)(1),
(2) Date: Nov. 17, 2020

(87) PCT Pub. No.: WO2019/220392
PCT Pub. Date: Nov. 21, 2019

(65) Prior Publication Data
US 2021/0078037 A1   Mar. 18, 2021

(30) Foreign Application Priority Data

May 17, 2018  (IT) .................. 102018000005470

(51) Int. Cl.
| | |
|---|---|
| *B05D 1/06* | (2006.01) |
| *B05D 1/32* | (2006.01) |
| *B05D 3/02* | (2006.01) |
| *B05D 3/10* | (2006.01) |
| *F16D 65/00* | (2006.01) |

(52) U.S. Cl.
CPC .............. *B05D 1/06* (2013.01); *B05D 1/32* (2013.01); *B05D 3/0272* (2013.01); *B05D 3/10* (2013.01); *F16D 65/0068* (2013.01); *B05D 2503/00* (2013.01); *B05D 2504/00* (2013.01); *B05D 2508/00* (2013.01); *F16D 2250/0046* (2013.01)

(58) Field of Classification Search
None
See application file for complete search history.

(56) References Cited

U.S. PATENT DOCUMENTS

| | | | | |
|---|---|---|---|---|
| 6,129,041 | A * | 10/2000 | Maiworm | ............... B05B 12/30 118/500 |
| 2007/0068750 | A1* | 3/2007 | Hara | ................... F16D 69/0408 188/251 A |
| 2008/0085402 | A1* | 4/2008 | Leininger | ............. B05D 5/068 428/200 |

(Continued)

OTHER PUBLICATIONS

European Patent Office, International Search Report with Written Opinion, issued in PCT/IB2019/054071, dated Aug. 29, 2019, 9 pages, European Patent Office, Rijswijk, Netherlands.

(Continued)

*Primary Examiner* — Shamim Ahmed
*Assistant Examiner* — Bradford M Gates
(74) *Attorney, Agent, or Firm* — Marshall & Melhorn, LLC

(57) ABSTRACT

A powder-coating process of a brake caliper has in sequence the steps of: (a) preparing the brake caliper; (b) applying masking elements to at least one seat and/or duct of said brake caliper; (c) distributing the coating powder on at least one portion of said brake caliper; (d) removing the at least one masking element by automated de-masking means; (e) curing inside a curing oven.

11 Claims, 2 Drawing Sheets

(56) References Cited

U.S. PATENT DOCUMENTS

2012/0237682 A1* 9/2012 Hong .................... C23C 14/042
                                                                118/712

OTHER PUBLICATIONS

Italian Patent Office, Italian Search Report, issued in IT102018000005470, dated Nov. 27, 2018, 8 pages, with screen shots of the cited Eastwood Company youtube video, Italian Patent Office.
Eastwood Company, How to Powder Coat Brake Calipers—Powder Coating Custom Brembo Brake Calipers from Eastwood, http://www.youtube.com/watch?v=5hNKMVQdCJA; XP054978899.

* cited by examiner

POWDER-COATING PROCESS OF A BRAKE CALIPER

FIELD OF APPLICATION

The present invention relates to a power-coating process of a disc brake caliper.

BACKGROUND ART

As known, powder coating is a particular type of coating, which is characterized by the distribution of a polymer powder on a substrate to which it adheres by electrostatic effect. Subsequently, the powder thus distributed is subjected to a heating inside an oven sufficient to melt and/or polymerize the polymer powder, whereby obtaining a compact and elastic layer.

The main difference with respect to other coating methods is in the use of dry polymer powder, i.e. in absence of a liquid phase with which the pigmenting and primer substances are usually mixed, and which are used for carrying and initially fixing them to the substrate.

One of the main advantages of this coating technique is that the absence of a liquid phase allows achieving thick and elastic coatings, which may be comprised between 0.06 and 0.12 mm, in a single coating cycle.

The main steps of the powder-coating process may be summarized in the following steps:
preparing the substrate to be coated;
masking portions of the substrate which must be free from coating;
distributing the coating powder;
heating; and
removing the masking.

The step of preparing the substrate is substantially a step of cleaning the substrate so that it does not have impurities, oxidations, greasy substances or, more in general, residues of previous processes.

It is known to subject the substrate, and consequently the item, e.g. to steps of phosphating, degreasing and washing possibly with demineralized water and to the respective steps of drying in an oven.

The term "masking" means a whole of preventive covering operations of portions of a substrate of a component in order to prevent such portions from being coated by mistake.

It is known that masking may assume different methods and embodiments according to the portion to be masked. For example, masking can be accomplished by means of:
masking adhesive tape;
adhesives protective discs to cover cavities;
cylindrical, conical, threaded plugs to protect a seat; or
caps to protect protruding ducts.

The materials which are used must be suited to withstand the heating temperatures used to melt and/or polymerize the powder coating, i.e. temperatures of the order of 200° C. Typically, the materials which are used are: low-density polyethylene, polypropylene or stabilized silicone.

After masking the component, the powder is distributed on the substrate to be coated.

As known, the powder may be, for example, of the polyurethane type.

The powder forms a film which is homogeneously arranged on the surface of the object by electrostatic effect.

Subsequently, the component on which the powder coating has been distributed is subjected to heating, typically in a curing oven, at a temperature of about 200° C. for about 20-30 minutes, sufficient to melt and/or polymerize the powder coating.

Finally, the masking is removed and the coating is possibly touched up.

As known, one of the main problems related to masking is the presence in the coated product of accumulations of coating or burrs at the interface between the masking and the coated portion.

For these reasons, the possibility of defects is higher if the coating involves seats for components or ducts intended for a fluid flow. FIGS. 1 and 2 show two examples of possible defects which may occur in the aforementioned areas.

For example, in FIG. 1 reference numeral 14 indicates a seat of a component after coating, comprising a cavity 18 and a mouth 16. The term mouth means the trace of the seat at the outer surface of the component. FIG. 1 also shows the interface 20 between the previously masked area and the coated area, in which the presence of a defect 22, which consists accumulations of coating, can be noted.

FIG. 2 schematically shows a seat 14 for a pin which comprises a counterbore. Again, in this case, the presence of a defect 22 can be noted at the interface 20 between the previously masked area and the coated area, also due to the presence of coating accumulations.

For these reasons, the coating of brake calipers, in which seats, ducts and counterbores are present, is a particularly complex process entrusted exclusively to highly experienced operators.

The steps of coating of a caliper are performed manually by an operator who:
arranges the masking and in particular inserts the masking in the seats and/or in the ducts;
distributes the coating powder on the substrate to be coated; and
after the step of curing, removes the masking and in particular extracts the masking from the seats and ducts.

If coating defects are present, in particular at the interface between masking and coating, the brake caliper is reworked by the operator, who solves the defect, e.g. by manual filing, sandpaper or cutter.

The coating process of brake calipers according to the prior art although widely used and appreciated, is not free from drawbacks.

Firstly, the presence of seats and mouths of the ducts of the brake caliper constitute zones which may potentially be affected by the type of defects discussed above.

Additionally, since the process is performed manually by operators, it is affected by a variability of distribution of the coating between the brake calipers.

Moreover, being the process affected by variability due to the manual intervention by the operator, even the same zones at the interface between masking and coating may not always be coated in the same manner, and may, in such case, display defects. Hence the problem of having to re-inspect the coating of each caliper in order to avoid the presence of defects and therefore problems during the operation of the caliper itself.

PRESENTATION OF THE INVENTION

The need is therefore felt to solve the drawbacks and limitations mentioned above with reference to the prior art.

The need is therefore felt to provide a coating process of a brake caliper in which the problems of coating which usually occur at the interface between masking and coating are avoided.

Moreover, it is desired to make the coating process of the caliper less affected by the problems linked to the variability of the coating cycle.

Furthermore, the need is felt for a method which allows reducing production costs, due in particular to production waste or to the need to rework the brake calipers for correcting possible defects.

Furthermore, the need is felt to eliminate the possibility of contaminations in the hydraulic circuit of the brake caliper, e.g. due to the detachment of small portions of coating in the interface between the masked and coated zone.

Moreover, the need is felt to improve the aesthetic appearance of the brake caliper, and in particular to improve the coating at the interface between masked and coated zone.

Such requirements are satisfied by a powder-coating process of a brake caliper according to claim 1.

In particular, they are satisfied by a powder-coating process of a brake caliper comprising in sequence the steps of:
preparing the brake caliper;
applying at least one masking element to at least one seat and/or duct of said brake caliper;
distributing powder coating on at least one portion of said brake caliper (12);
removing the at least one masking element with automated de-masking means;
curing inside a curing oven.

According to a possible embodiment, the preparation of the brake caliper comprises the steps of:
phosphatisation;
degreasing;
washing with water also demineralized; and
drying.

According to a possible embodiment, the step (b) of applying at least one masking element is performed by automated masking means.

According to a possible embodiment, the step (d) of total removing of the masking elements of the seats and/or ducts of said brake caliper is performed by automated de-masking means.

According to a possible embodiment, the automated de-masking means comprise at least an anthropomorphic robot.

According to a possible embodiment, the masking means of an automated type comprise at least an anthropomorphic robot.

According to a possible embodiment, the masking comprises a transition portion, near the mouth of at least one seat and/or duct of said brake caliper.

According to a possible embodiment, the transition portion consists of a portion substrate portion which is not visible in use.

According to a possible embodiment, the transition portion comprises a portion of substrate adjacent to the mouth of the seats and/or ducts, having a width comprised between 1 mm and 20 mm starting from the mouth.

According to a possible embodiment, the brake caliper is handled by means of claw devices, adapted to insert and grip at least one seat, said claw device also being used to mask the respective seat, said transition portion comprising a portion of substrate adjacent to the mouth of the seats and/or ducts, having a width comprised between 1 mm and 80 mm starting from the mouth.

According to a possible embodiment of the present invention, a coating powder of the polyurethane, polyester or epoxy type is used.

DESCRIPTION OF THE DRAWINGS

Further features and advantages of the present invention will be more comprehensible from the following description of preferred examples of embodiments given by way of non-limiting examples, in which.

Elements or parts in common to the embodiments described below will be indicated using the same reference numerals.

DETAILED DESCRIPTION

Figure 1:
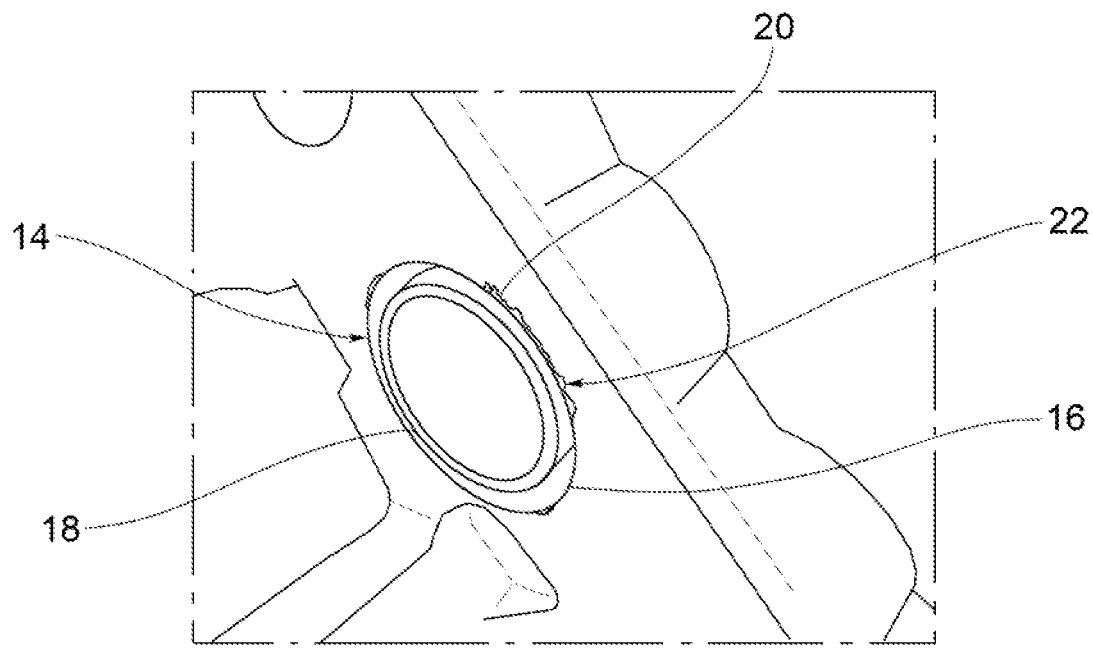
FIG. 1 and FIG. 2 schematically show the defects that may be found with a coating process according to the prior art.
Figure 2:
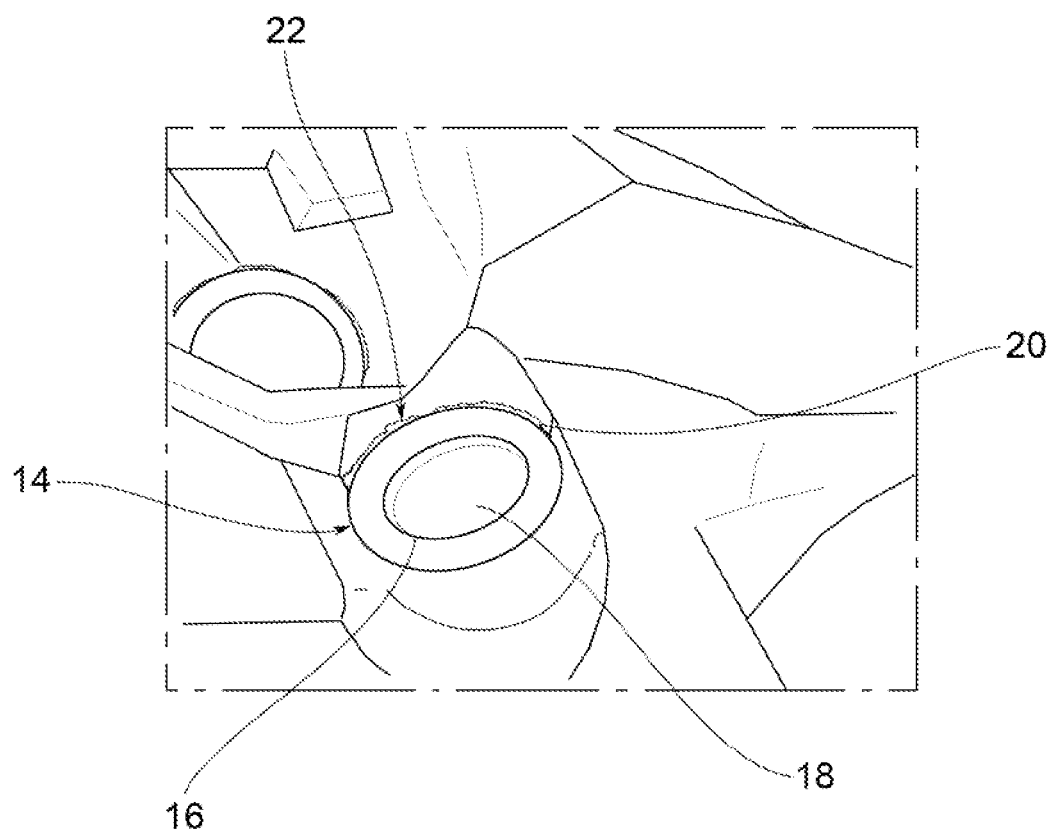
Figure 3:
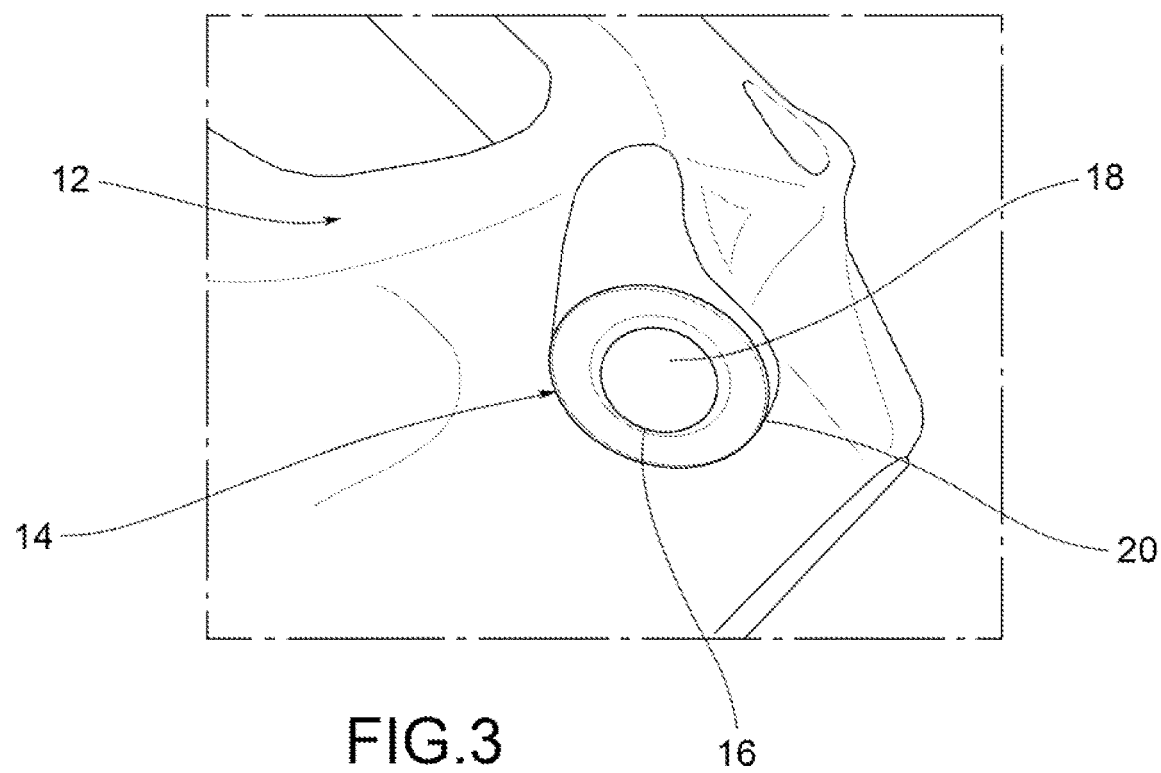
FIG. 3 schematically shows a detail of a brake caliper subjected to a coating process according to the present invention.
Figure 4:
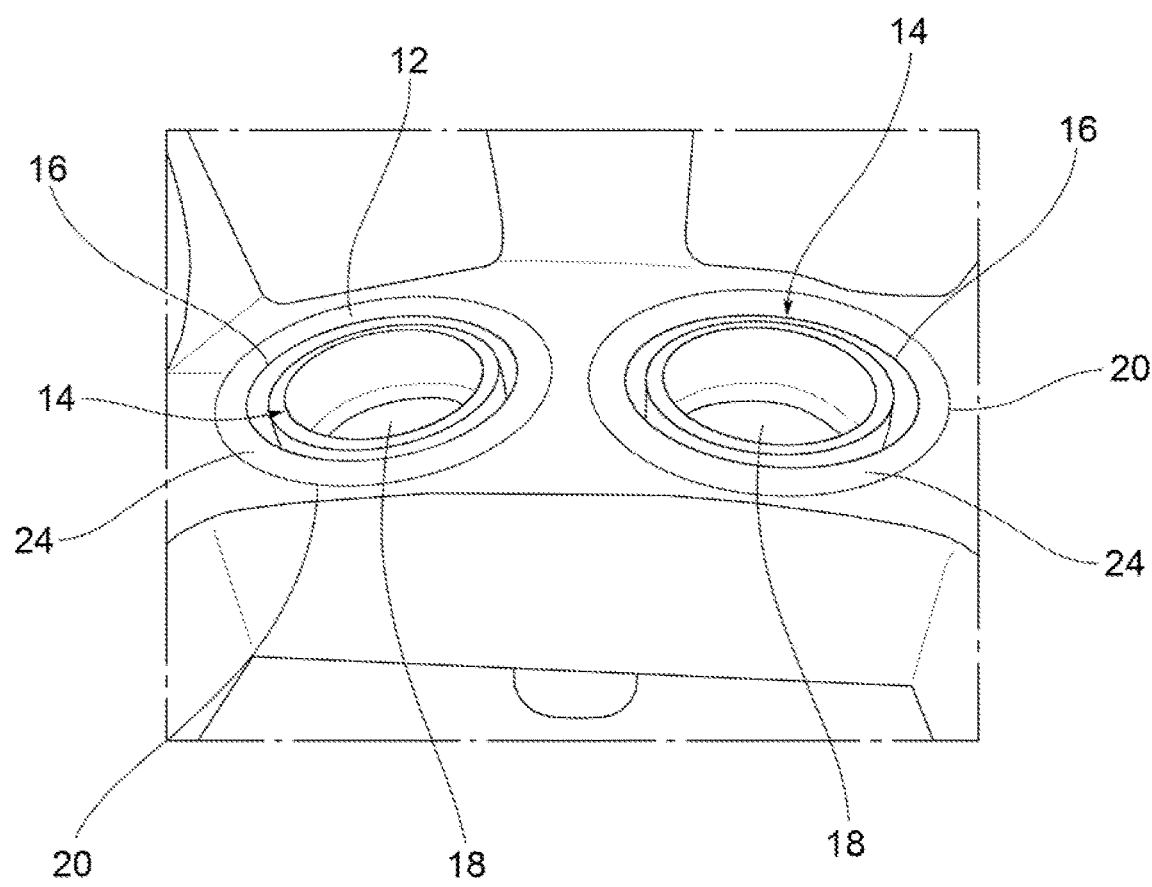
FIG. 4 schematically shows a second detail of a brake caliper subjected to a coating process according to the present invention.

FIGS. 3 and 4 show portions of a brake caliper indicated by reference numeral 12 in general.

In intrinsically known manner, the brake caliper 12 comprises seats and/or ducts 14.

For simplicity of reference, hereinafter in the present description, the generic term "seat" means a seat, a duct, a threaded seat.

In particular, each seat 14 comprises a respective mouth 16. The mouth 16 consists of a portion of the outer surface of the caliper 12 immediately adjacent to the respective seat and/or the duct 14.

The powder-coating process of a brake caliper 12 according to the present invention comprises in sequence the steps of:
(a) preparing the brake caliper 12;
(b) applying at least one masking element to at least one seat and/or duct 14 of said brake caliper 12;
(c) distributing powder-coating on at least one portion of said brake caliper 12;
(d) removing the at least one masking element by automated de-masking means;
(e) curing inside a curing oven.

The preparation of the brake caliper may comprise the steps of:
phosphatisation;
degreasing;
washing with water also demineralized; and
drying.

The masking elements may comprise, for example: circular plugs or caps shaped with appropriate geometry to the area to be masked.

According to a possible embodiment, the step (b) of applying the masking elements is performed by automated masking means.

The masking means of automated type may comprise at least one anthropomorphic robot.

The de-masking means of automated type may comprise at least one anthropomorphic robot.

In a possible embodiment of the present invention, the step (b) of applying the masking elements, and step (d) in which the at least partial removal of the masking elements takes place is performed by same automated means. In particular, the masking and de-masking means of automated type may coincide.

The removal of the masking elements of step (d) can involve all the masking elements.

In alternative embodiments, some of the masking elements may be removed manually, before or after the step of curing.

Accordance with a possible embodiment of the present invention, the coating process may be managed by a programmable control unit.

In particular, the programmable control unit may manage the movement of the masking means and/or de-masking means.

In a possible embodiment, the programmable control unit allows the loading of handling programs of the masking and/or de-masking elements according to the type of brake caliper to be coated.

The programmable control unit may also allow the loading of programs for automated handling of the brake calipers inside the plant, between the various steps of the coating process. In this regard, the programmable control unit may also allow the automated management of the curing oven, as regards the introduction and extraction of the brake calipers and the curing parameters of the brake calipers.

In accordance with a possible embodiment of the present invention, the calipers may be handled by means of claw devices, adapted to be inserted and grip at at least one seat 14. Advantageously, said at least one seat 14 may be at least one seat of the pistons of the brake caliper. In this case, the claw device may also be used as masking of the respective seat.

According to a possible embodiment of the present invention, at least one claw device is inserted inside at least one seat and engages said caliper at at least one seat and handles the brake caliper between the steps of masking and of coating powder distribution. Subsequently, the at least one claw device disengages the brake caliper and the brake caliper is cured inside a curing oven.

According to a possible embodiment of the present invention, the at least one claw device may be moved by at least one anthropomorphic robot.

In a possible embodiment of the coating process according to the present invention, at least one transition portion 24 can be provided. The expression transition portion 24 means a portion of the substrate from the mouth 16 of the seat 14, which is covered by the masking during the step of distributing of the coating powder, which has an increased extension with respect to what occurs in the known art.

FIG. 4 shows two seats 14, with respective transition portions 24.

The transition portions 24 may comprise a portion of the substrate adjacent to the inlet of the seats 14 which is not visible in use.

Advantageously, the transition portion 24 comprises a portion of substrate adjacent to the mouth of the seats 14, having a width comprised between 1 mm and 20 mm starting from the mouth 16 of the seat 14.

If the claw devices described above are used, the width of the transition portion may be between 1 mm and 80 mm starting from the mouth 16 of the seat 14.

The advantage of providing the transition portions 24 is to allow an easier removal of the masking elements from the respective seats. In other words, by using the transition portions, the interface 20 between the masking and the coated portion is moved away from the mouth 16 of the seat 14.

The step of distributing of the coating powder is performed once the masking elements are applied.

In a possible embodiment of the present invention, the coating powder is of the polyurethane type.

According to alternative embodiments, it is possible to use a polyester or epoxy type coating powder.

As indicated above, the masking elements are then partially or totally removed by automated means, to which reference was made above.

Once the brake caliper is partially free or completely free of masking elements, it is subjected to heating in a curing oven, at a temperature of about 200° C. for about 10-30 minutes, sufficient to melt and/or polymerize the powder coating.

As specified above, some of the masking elements, e.g. masking elements which are not at seats, may be maintained during curing, and subsequently removed.

The advantages which can be achieved by a powder-coating process of a brake caliper according to the present invention are therefore apparent.

Firstly, the automation of the entire coating process and specifically of the masking elements removal operation makes it possible to anticipate such a step with respect to curing, whereby avoiding the generation of coating defects, in particular of burrs or accumulations of coating.

By avoiding the presence of burrs or accumulations, their possible detachment during use of the disc brake caliper, with respective problems of operation, is thus prevented.

In particular, the possibility of contaminations in the hydraulic circuit of the brake caliper, e.g. due to the detachment of small portions of coat in the interface between the masked and coated zone, is drastically reduced.

Furthermore, it is possible to improve the coating in the zone of the pistons, in the zone of the pin, and in the recesses of the ears of the brake caliper.

The automated process allows reducing coating costs because it allows setting a specific coating cycle which, in autonomous manner, may guarantee a higher hourly production rate. Moreover, they require fewer checks on the presence of any defects.

Furthermore, the coating costs are decreased because the costs related to the reworking of calipers to correct possible defects are reduced.

Furthermore, the aesthetic appearance of the brake caliper is improved because the coating is free from burrs or accumulation at the interface between masking and coating.

Furthermore, the variability of the process is decreased to the benefit of brake caliper quality and time and resources needed to inspect the coated brake calipers.

In the embodiments described above, a person skilled in the art will be able to make changes and or substitutions of elements described with equivalent elements without departing from the scope of the appended claims in order to satisfy specific requirements.

The invention claimed is:

1. A powder-coating process of a brake caliper comprising in sequence the steps of:
    (a) preparation of the brake caliper;
    (b) application of at least one masking element to at least one seat and/or duct of said brake caliper;
    (c) distribution of the powder-coating on at least one portion of said brake caliper;
    (d) removal of the at least one masking element by automated de-masking means; and
    (e) cooking inside a cooking oven.

2. The coating process according to claim 1, wherein the preparation of the brake caliper comprises the steps of:

phosphatisation;
degreasing;
washing with water also demineralized; and
drying.

3. The coating process according to claim 1, wherein the step (b) of applying at least one masking element is performed by automated masking means.

4. The coating process according to claim 1, wherein during the step (d) the removal of the masking elements of the seats and/or ducts of said brake caliper is performed by automated de-masking means.

5. The coating process according to claim 1, wherein the automated de-masking means comprise at least one anthropomorphic robot.

6. The coating process according to claim 3, wherein the automated masking means comprise at least one anthropomorphic robot.

7. The coating process according to claim 1, wherein the at least one masking element comprises a transition portion, near a mouth of at least one seat and/or duct of said brake caliper.

8. The coating process according to claim 7, wherein the transition portion consists of a portion of substrate which in use is not visible.

9. The coating process according to claim 7, wherein the transition portion comprises a portion of substrate adjacent to the mouth of the seats and/or ducts, having a width comprised between 1 mm and 20 mm starting from the mouth.

10. The coating process according to claim 7, wherein movement of the brake caliper takes place by means of claw devices, suitable for inserting and gripping at least one seat, one of said claw device also being used to mask the respective seat, said transition portion comprising a portion of substrate adjacent to the mouth of the seats and/or ducts, having a width comprised between 1 mm and 80 mm starting from the mouth.

11. The coating process according to claim 1, wherein a coating powder of polyurethane, polyester or epoxy is used as the powder-coating.

\* \* \* \* \*